(12) United States Patent
Liu et al.

(10) Patent No.: US 8,954,910 B1
(45) Date of Patent: Feb. 10, 2015

(54) DEVICE MISMATCH CONTRIBUTION COMPUTATION WITH NONLINEAR EFFECTS

(71) Applicant: Cadence Design Systems, Inc., San Jose, CA (US)

(72) Inventors: Hongzhou Liu, Sewickley, PA (US); Wangyang Zhang, Pittsburgh, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/166,119

(22) Filed: Jan. 28, 2014

Related U.S. Application Data

(63) Continuation-in-part of application No. 13/830,696, filed on Mar. 14, 2013, now Pat. No. 8,813,009.

(51) Int. Cl.
   *G06F 17/50* (2006.01)
(52) U.S. Cl.
   CPC ........ *G06F 17/5018* (2013.01); *G06F 17/5045* (2013.01)
   USPC .................. 716/106; 716/51; 716/52; 716/53; 716/112
(58) Field of Classification Search
   CPC .............. G06F 17/5022; G06F 17/504; G06F 17/5036; G06F 17/5081; G06F 17/5045; G06F 17/5018
   USPC .................................. 716/51, 52, 53, 106, 112
   See application file for complete search history.

(56) References Cited

U.S. PATENT DOCUMENTS

| 2008/0022232 A1* | 1/2008 | McConaghy et al. ............ 716/1 |
| 2013/0226544 A1 | 8/2013 | Mcconaghy et al. |

OTHER PUBLICATIONS

Donoho, D, "Compressee sensing," IEEE Trans. Information Theory, vol. 52, No. 4, pp. 1289-1306, Apr. 2006.
Candes, E., "Compressive sampling," International Congress of Mathematicians, 2006, pp. 1-20.
Tropp, J. et al., "Signal recovery from random measurements via orthogonal matching pursuit," IEEE Trans, Information Theory, vol. 53, No. 12, pp. 4655-4666, Dec. 2007.
Li, X., et al., "Large-scale statistical performance modeling of analog and mixed-signal circuits," IEEE Custom Integrated Circuits Conference, 2012, pp. 1-8.
Mallat, S., et al., "Matching Pursuits With Time-Frequency Dictionaries," IEEE Transactions on Signal Processing, vol. 41, No. 12, Dec. 1993, pp. 3397-3415.

(Continued)

*Primary Examiner* — Vuthe Siek
(74) *Attorney, Agent, or Firm* — Kenyon & Kenyon LLP

(57) ABSTRACT

A system, method, and computer program product for computing device mismatch variation contributions to circuit performance variation. Embodiments estimate which individual devices in a simulated circuit design have the largest impact on circuit performance, while requiring far fewer simulations than traditional multivariate linear regressions. When the samples exceed the mismatch parameters, a linear model is solved by least squares. Otherwise, a linear model is solved by orthogonal matching pursuit (OMP), and if that solution is too inaccurate then a new mixed method builds a better linear model. If the linear solution is too inaccurate, a full linear and quadratic model is made using OMP to select the most important variables, and the full model is fitted using OMP with selected cross terms. The embodiments summarize the output variance in each device, and rank the mismatch contributions based on the summarized contributions.

17 Claims, 13 Drawing Sheets

(56) References Cited

OTHER PUBLICATIONS

Grömping, Ulrike "Relative importance for Linear Refression in R: The Package relaimpo," Journal of Statistical Software, vol. 17, Issue 1, Oct. 2006, pp. 1-27.

Zhang, W., et al, "Toward efficient large-scale performance modeling of integrated circuits via multi-mode/multi-corner sparse regression," Design Automation Conference, Jun. 2010, pp. 897-902.

Tropp, J., "Computational methods for sparse solution of linear inverse problems," Proceedings of the IEEE, vol. 98, No. 6, Jun. 2010, pp. 948-958.

Liu, J., et al., "On Average Predictive Comparisons and Interactions," International Statistical Review, vol. 76, No. 3, Dec. 2008, pp. 419-432.

Ghanem, R.G., et al., "Stochastic Finite Elements: A Spectral Approach," New York: Springer-Verlag, 1991, pp. 42-62.

\* cited by examiner

US 8,954,910 B1

DEVICE MISMATCH CONTRIBUTION COMPUTATION WITH NONLINEAR EFFECTS

CROSS REFERENCE TO RELATED APPLICATIONS

The present application is a continuation-in-part of U.S. application Ser. No. 13/830,696, entitled "Computing Device Mismatch Variation Contributions", filed on Mar. 14, 2013, and which is hereby incorporated by reference in its entirety.

FIELD OF THE INVENTION

This patent application relates to the field of circuit simulation, and more precisely to computing device mismatch variation contributions to circuit performance variation.

BACKGROUND

As integrated circuits scale to finer feature sizes, (e.g., with features at or below 45 nm), process variations become increasingly difficult to capture with traditional modeling techniques. Understanding statistical variations has become increasingly important in design efforts to ensure manufacturability and improve parametric yield. Mismatch variation between individual devices is particularly important, so management of mismatch variation impact on circuit performance variation should be made at the circuit design stage.

Variations in circuit performance are often modeled as an additive combination of linear variations. Each variation may typically describe a physical parameter such as an oxide thickness or a threshold voltage. A statistical transistor model may have several mismatch parameters to model its mismatch variations. However, simple linear sensitivity analysis does not provide enough information for designers to fully optimize the design. It provides only sensitivity coefficients for each mismatch parameter, and does not provide information on which particular device in a circuit design has the highest impact on overall circuit performance.

The computational expense of including circuit performance variation analysis in a design cycle can be significant or even prohibitive with current methods. The simulation time of simple OFAT (one-factor-at-a-time) sensitivity analysis generally depends on the number of devices in a circuit multiplied by the number of different mismatch parameters for each. For example, ten mismatch parameters and a thousand devices would require at least 10001 Monte Carlo circuit simulations in current OFAT sensitivity analysis schemes.

Accordingly, the inventors identified a need for identifying important mismatch variation contributions from devices in a circuit design, and with significantly less computational expense than is required for traditional multivariate linear regression.

For example, when the number of sample data points is less than the number of different mismatch parameters, it may not be possible to determine the accuracy of the orthogonal matching pursuit (OMP) model previously described. Further, in some cases, circuit performance variation may be very nonlinearly related to the mismatch parameters. In such cases, the linear mismatch contributions to performance variation will have very low coefficient of determination ($R^2$) values, because linear regression models cannot adequately describe the underlying nonlinear relationships. In other words, the linear mismatch contribution results are not sufficiently representative, because they miss the major variance of the actual output performance.

The inventors have therefore developed a comprehensive methodology to calculate device mismatch variation contributions with a limited number of samples to address these concerns.

DETAILED DESCRIPTION

Figure 1:
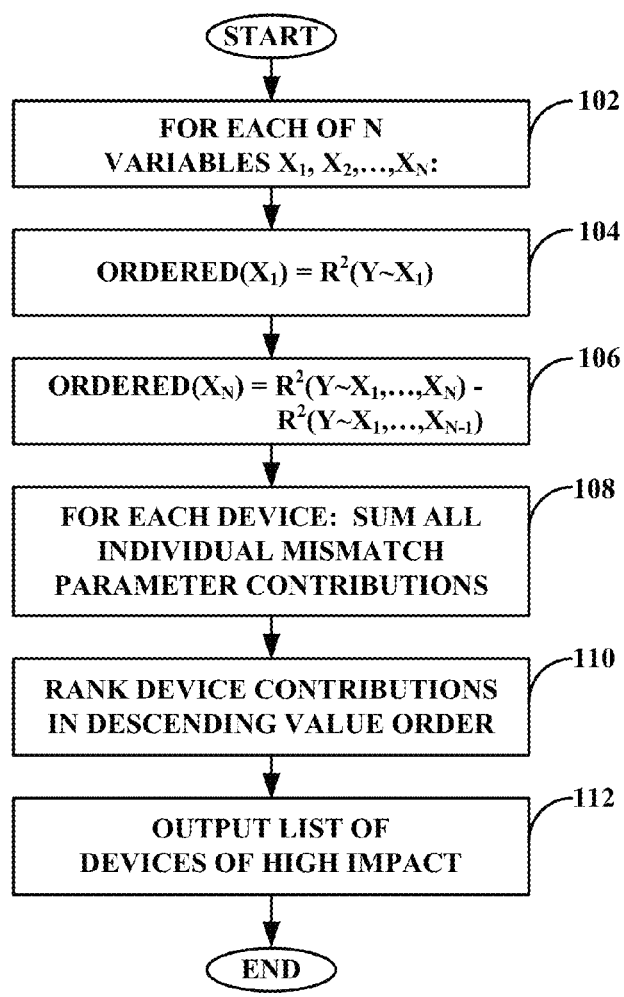
FIG. 1 is a flowchart of an output variance allocation method, according to an embodiment.

A system, method, and computer program product for computing device mismatch variation contributions to circuit performance variation are described. Embodiments may first determine the individual contribution of each mismatch parameter to the circuit performance, then summarize all the individual mismatch parameters' contributions for a particular device to formulate the overall mismatch contribution for that device. The embodiments thus estimate which individual devices in a simulated circuit design have the largest impact on circuit performance. In instances where insufficient data exists for a direct solution, an underdetermined solution may be found through optimization. The result is that far fewer simulations may be required than with traditional multivariate linear regressions.

Embodiments may provide an empirical formula to estimate the accuracy of the orthogonal matching pursuit optimization algorithm used to find the underdetermined solution. Users may thus quantitatively determine whether the modeled solution is sufficient, or whether other approaches are needed that provide higher accuracy.

Other embodiments may provide such higher accuracy solutions, by automatically constructing a quadratic model when a linear model is insufficient. Further, an embodiment for assigning the variance of cross terms in a quadratic model to its two related variables is also provided.

One approach to the problem of allocating variance in a circuit's performance measure is as follows. Define a number of individual mismatch parameters $x_1, x_2, \ldots x_N$. Each individual mismatch parameter x may correspond to a physical variation of a particular device in the circuit design, e.g., a threshold voltage variation of device N7, or an oxide thickness variation of device P12, etc. These individual mismatch parameters may be correlated, perhaps strongly so in a semiconductor fabrication process.

Define the output y as the performance measure of interest for the entire circuit design, e.g., an amplifier's gain. The output y may be modeled as a multiple linear regression on the individual mismatch parameters:

$$y = \alpha_0 + \alpha_1 x_1 + \alpha_2 x_2 + \ldots + \alpha_N x_N + \epsilon$$

Here the coefficients $\alpha_0, \alpha_1, \ldots \alpha_N$ are coefficients to be determined, and $\epsilon$ represents the part of the performance measure that cannot be explained by the summed weighted impact of the individual mismatch parameters. In linear regression, the coefficients are estimated by minimizing the sum of squared unexplained parts. The first aspect of the overall problem is thus to determine the individual contribution of each mismatch parameter $x_i$ to the performance y.

The coefficient of determination $R^2$, which may be considered a goodness-of-fit for a linear regression model, may be defined as:

$$R^2(y \sim x_1, \ldots, x_N) = 1 - \frac{\text{Var}(\varepsilon)}{\text{Var}(y)} = \frac{\text{Var}(a_1 x_1 + a_2 x_2 + \ldots + a_N x_N)}{\text{Var}(y)}$$

where Var( ) means sample variance. In other words, $R^2$ is a measure of what percentage of the performance measure variation may be explained by the N regressors in the model. For completely uncorrelated regressors $x_i$, each of the univariate $R^2$ values simply add up to the full model's $R^2$:

$$\frac{\text{Var}(a_1 x_1 + a_2 x_2 + \ldots + a_N x_N)}{\text{Var}(y)} = \sum_{i=1}^{N} \frac{\text{Var}(a_i x_i)}{\text{Var}(y)} = \sum_{i=1}^{N} R^2(y \sim x_i)$$

In situations where individual mismatch parameters are correlated however, it is not straightforward to allocate the performance measure's $R^2$ into contributions from the individual mismatch parameters. The order in which individual regressor contributions are evaluated may have a strong influence on the allocations. Often a first regressor selected to explain observed variation is assigned too much influence, and the remaining regressors put forth to explain the residual variation are assigned too little influence.

Two important objectives therefore need to be considered in order to reasonably define the individual contribution $x_i$ to the overall model:

Objective 1: If $x_i$ explains a lot of variance, then a high contribution should be assigned to $x_i$.

Objective 2: If the variance explained by $x_i$ can be also explained by other variables, then a lower contribution should be assigned to $x_i$.

These two objectives can conflict with each other, and can lead to different criteria for computing contributions.

One metric that has been used in the past is the so-called "first" metric, which computes the individual contributions based on the $R^2$ of a single regressor. This metric is discussed in the following reference, which is hereby incorporated by reference in its entirety: Groemping, U., "Relative Importance for Linear Regression in R: The Package relaimpo," Journal of Statistical Software 17, Issue 1, 2006. The term "first" means that the amount of variance is explained if only a first regressor $x_i$ is used, and all other individual contributions are ignored. This metric is defined as:

$$\text{first}(x_i) = R^2(y \sim x_i)$$

This metric fully considers the first objective, but also fully ignores the second objective. Further, the computed sum of individual contributions may be greatly larger than the model $R^2$.

$$\sum_{i=1}^{N} \text{first } (x_i) = \sum_{i=1}^{N} R^2(y \sim x_i) >> R^2(y \sim x_1, \ldots x_N)$$

Another metric that has been used in the past is the so-called "last" metric, which allocates individual contributions based on the marginal improvement in the model $R^2$ that may be provided by a particular regressor after all other regressors have been considered. This metric is defined as:

$$\text{last}(x_i) = R^2(y \sim x_1, \ldots, x_N) - R^2(y \sim x_1, \ldots, x_{i-1}, x_{i+1}, \ldots, x_N)$$

This metric fully considers the second objective, but essentially ignores the first objective. If two strongly correlated variables both significantly impact the performance, the contribution allocated to each will both be extremely small. Also, the computed sum of individual contributions may be greatly smaller than the model $R^2$.

$$\sum_{i=1}^{N} \text{last } (x_i) << R^2(y \sim x_1, \ldots, x_N)$$

There is a metric that addresses the shortcomings of these and other known metrics for allocating contributions of regressors that are not entirely uncorrelated. The "ordered" metric computes the contributions based on a pre-defined order indicating the prior knowledge gained on the importance of previous contributions. Suppose the order is $x_1, x_2, \ldots, x_N$. The "ordered" metric is defined as:

$$\text{ordered}(x_1) = R^2(y \sim x_1)$$

$$\text{ordered}(x_2) = R^2(y \sim x_1, x_2) - R^2(y \sim x_1)$$

.

.

.

$$\text{ordered}(x_N) = R^2(y \sim x_1, \ldots, x_N) - R^2(y \sim x_1, \ldots, x_{N-1})$$

For the "ordered" metric, the first variable $x_1$ contribution may be computed using the "first" method previously described. The last variable $x_N$ contribution may be computed using the "last" method previously described. The influences of other variables may be computed as their marginal influences in view of the influences of all previously considered variables. In other words, the influence of a given variable may be allocated as being the difference in variation due to that variable and all others considered up to that point, minus the variations due only to all others that were considered up to that point.

In the "ordered" metric, if two variables are strongly correlated, only one of them may be given a high contribution. In contrast, in such circumstances the "first" metric may yield a high contribution for both, while the "last" metric may yield a nearly zero contribution for both; such results are clearly inadequate. The "ordered" metric has the further advantage that the computed sum of individual contributions is exactly equal to the model $R^2$:

$$\sum_{i=1}^{N} \text{ordered}(x_i) = R^2(y \sim x_1, \ldots, x_N)$$

This metric may allow the improved solution of the second part of the overall problem: summarizing the individual mismatch parameters' contributions for a particular device to formulate the overall mismatch contribution for that device. When using the "ordered" metric, the computed sum of the individual devices' contributions is exactly equal to the model $R^2$. In other words, the circuit performance variation may be modeled as entirely due to the sum of all allocated device contributions, as each device contribution is the sum of individual allocated parameter contributions.

Individual device mismatch contributions may be sorted after computation, from greatest to least. The rank order of a device's mismatch contribution may thus be used to identify which devices have higher impact on the circuit's performance variation. The overall circuit performance variation may be related to circuit yield or design robustness, so proper simulation of variation may advance the commercial success of a circuit design.

Referring now to FIG. 1, a flowchart of an output variance allocation method as described above is shown, according to an embodiment. At 102, an array of variables $x_1$ to $x_n$, representing individual mismatch parameters is inputted, with the numbering being arbitrary. At 104, the contribution allocated to the first mismatch parameter $x_1$ is defined according to the "ordered" metric, which for this first variable is the same as the "first" metric would define, which is the coefficient of determination $R^2$ considering only the first mismatch parameter. At 106, the contributions allocated to the remaining mismatch parameters are defined according to the "ordered" metric that considers the influences of each further variable as being their marginal influences in view of the influences of all previously considered variables. At 108, the individual mismatch parameter contributions corresponding to a particular device may be summed to yield that particular device's total contributions to performance variance. At 110, the device contributions may be ranked in descending value order. At 112, the method may output a list of devices having high impact, that is, the highest device contributions to performance variance, along with the numerical contribution values.

Further advantages may be realized by the output variance allocation process described above when combined with the approach now described. Normally, the number of samples is generally equal to or larger than the number of parameters to build a linear regression model. While in some instances data may be available for computing all the individual mismatch parameters for all the devices in a circuit, in other instances such complete data may not be available. Since the total number of parameters can be very large, obtaining a similarly large number of samples may require significant and perhaps prohibitive time for simulation. Typically therefore only limited sample data are available to calculate the mismatch contributions, due to computational expense.

Solving a regression model when the available samples are fewer in number than the input parameters can be a challenging problem. The "ordered" metric variance allocation requires a fixed order for computing mismatch parameters. Different input variable orders will give different variance allocation results, so the ordering of the input variables needs to be determined. One approach considers these limitations.

Solving a system of linear equations (e.g., $A \cdot \alpha = B$) is a key step in many engineering problems. To obtain a unique solution from a linear system, traditionally the number of equations N should be at least the number of variables M. However, with the additional knowledge that the solution $\alpha$ is sparse (i.e., contains few non-zero variables), the solution may be estimated by solving the following optimization:

Minimize $\|\bullet\|_0$ with $\alpha$ subject to $A \cdot \alpha = B$, where $\|\bullet\|_0$ denotes the number of non-zeros in a vector.

The equality constraint may be relaxed to allow error tolerance on noise, modeling error, etc., so the optimization becomes:

Minimize $\|\bullet\|_0$ with $\alpha$ subject to $\|A \cdot \alpha - B\|_2 \leq \epsilon$, where $\|\bullet\|_2$ is the L2-norm (root sum of squares) of a vector. It is equivalent to the following problem:

Minimize $\|A \cdot \alpha - B\|_2$ subject to $\|\bullet\|_0 \leq k$ with $\alpha$.

In general, exactly solving these optimizations is NP-hard. However, several approximation algorithms have recently been proposed that can efficiently solve these optimizations in polynomial time. Moreover, it has been theoretically demonstrated that for a linear system where the A matrix is formed from independent Gaussian random variables (which is often the case for process variation in integrated circuits), the first optimization can be exactly solved with only $O(S \cdot \log M)$ equations, where S denotes the number of non-zeros. The accuracy is also proven to degrade gracefully with the increase of noise in the case of the second optimization. These results suggest that if sparsity can be found in a modeling problem, the model can be accurately built with significantly fewer samples. The following reference discusses this concept further, and is hereby incorporated by reference in its entirety: Tropp, J. and Gilbert, A., "Signal recovery from random measurements via orthogonal matching pursuit," IEEE Trans. Information Theory, vol. 53, no. 12, pp. 4655-4666, 2007.

Identifying the most important variables with as few Monte Carlo simulation samples as possible is a commercially important objective. The regression coefficients are often sparse in circuit simulations, as many device level variations have little impact on the performance measure of interest. Further, at the circuit level, the performance may only be strongly related to few transistors. Therefore, the number of samples needed for solving the optimization above grows only logarithmically with the number of variables, which makes mismatch contribution calculation possible even for large circuits.

Figure 2:
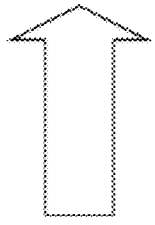
FIG. 2 is a diagram of a sparse linear system in matrix form, according to an embodiment.

Orthogonal matching pursuit (OMP) is a new technique to solve an underdetermined linear system. Matching pursuit (MP) in general is a type of numerical technique that involves finding the best matching projections of multidimensional data onto a weighted set of functions. OMP is an extension that updates all the coefficients extracted at a given point after every iterative step by computing the orthogonal projection of the data onto the set of functions evaluated so far. OMP provides the possibility to solve the linear regression modeling problem with fewer samples than the number of parameters, as described. OMP solves the linear system by finding the best sparse approximation to the regression model using k coefficients. However, the locations of the k non-zero values are unknown, as shown in FIG. 2.

Figure 3:
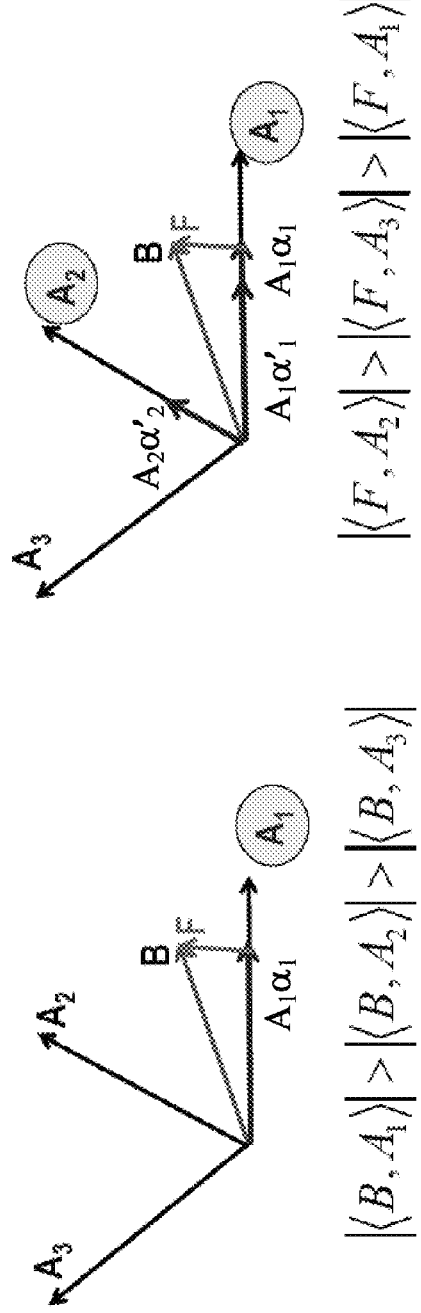
FIG. 3 is a diagram of orthogonal matching pursuit computations, according to an embodiment.

The operation of OMP may be described by a graphical example, as shown in FIG. 3. OMP is a greedy iterative method to solve the optimization problem by finding k basis functions. For each iteration, the OMP scheme: (1) calculates inner products to select one additional basis function, and (2) calculates least squares to re-evaluate the coefficients. For example let $A_1, A_2$, and $A_3$ be basis functions and B is a vector to be modeled as linear weighted combinations of those basis functions. An initial estimate of B might be $A_1\alpha_1$, where $\alpha_1$ is a weighting coefficient for $A_1$ which is the vector most closely approximating B (that is, the dot product of $A_1$ and B is greater than the dot products of either $A_2$ and B or $A_3$ and B). This estimate fails to model remainder vector F, however. Thus, in the second diagram of FIG. 3, a contribution from $A_2$ is found that models as much of vector F as possible, and new coefficient values $\alpha'_1$ and $\alpha'_2$ are computed such that the linear combination of $A_1\alpha'_1$ and $A_2\alpha'_2$ models B as closely as possible with two basis functions.

The method of using OMP to calculate the regression coefficients may simply comprise normalizing all mismatch parameters, then applying OMP to build the linear regressors. The greedy based OMP method will generate regression coefficients in best-fitting order, and will stop when enough variance is explained in the model. A nonlinear term may even be added as an input to capture nonlinear contributions in the OMP model, as will be described. The required sample data may be significantly less than the number of input parameters. There is no need to recalculate $R^2$ because it is part of the results of the OMP method.

Figure 4:
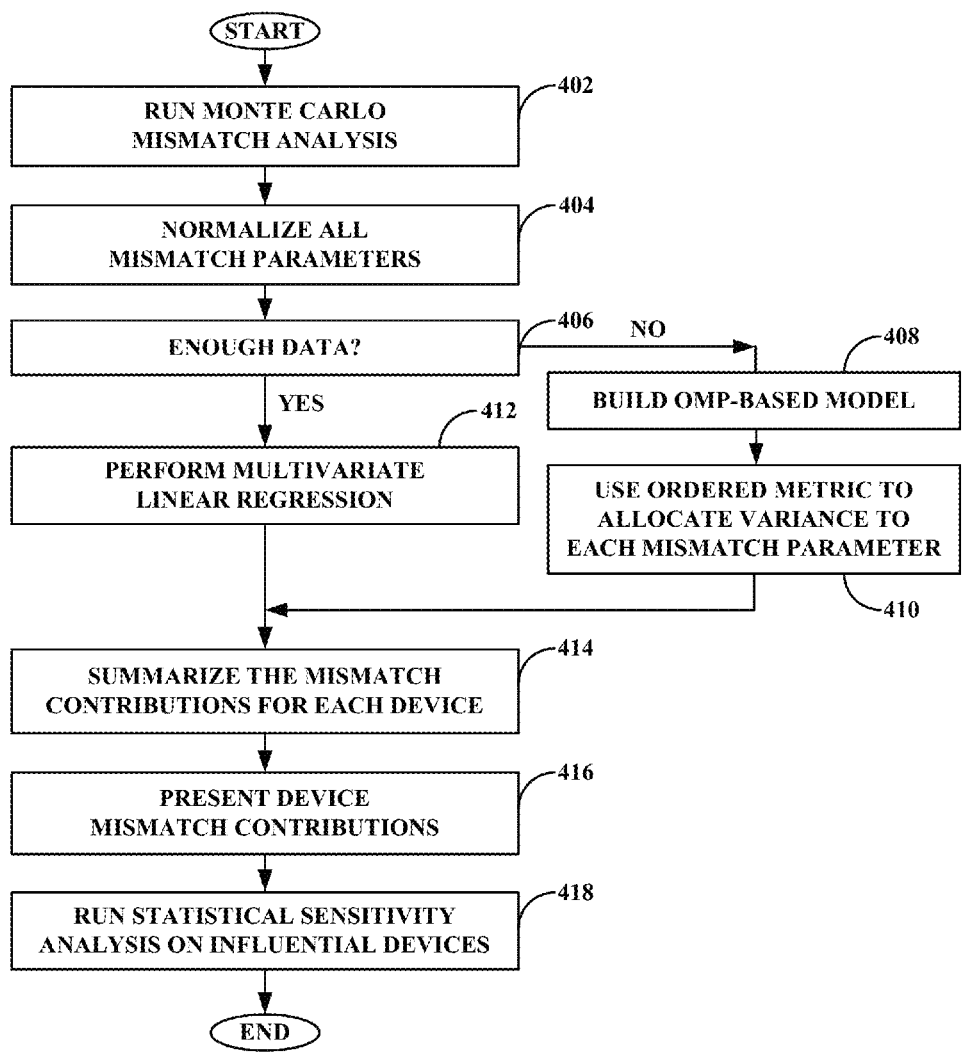
FIG. 4 is a flowchart of a mismatch contribution analysis method, according to an embodiment.

Referring now to FIG. 4, a flowchart of a mismatch contribution analysis method is shown, according to an embodiment. At 402, the method may run a Monte Carlo mismatch analysis to acquire data on circuit performance and its variation. At 404, the method may normalize all the individual mismatch parameters. At 406, the method may determine whether there is enough data available to directly solve for all coefficients in the multivariate linear regression model. If not, the method may proceed to 408 and 410 to determine an optimized approximate solution, and if so the method may proceed to 412 to perform the multivariate linear regression evaluation. Determining an optimized approximate solution may include building an OMP-based model at 408 and using the ordered metric to allocate variance to each individual mismatch parameter at 410. The method may continue at 414 by summarizing the mismatch contributions for each device, by summing all individual contributions corresponding to each device. At 416, the device mismatch contributions may be presented, in at least one of a flat view and a hierarchical view for example. At 418, the method may run a statistical sensitivity analysis on those devices that most highly influence circuit performance variation.

In many production scenarios the number of sample data points is far less than the number of different mismatch parameters. Under those conditions, users of the prior embodiments may not be able to readily determine the accuracy of the orthogonal matching pursuit (OMP) model previously described. Also, in some designs, circuit performance variation may be very nonlinearly related to the mismatch parameters. The linear mismatch contributions to performance variation will have very low coefficient of determination ($R^2$) values in such designs, because linear regression models simply cannot adequately describe the underlying nonlinear relationships. The linear mismatch contribution results are not sufficiently representative, because they miss the major variance of the actual output performance.

The inventors have therefore developed a comprehensive methodology to calculate device mismatch variation contributions with a limited number of samples to address these concerns. The methodology may selectively add model complexity until the model is measurably successful. The main points of the methodology are:

An empirical formula to estimate the accuracy of the orthogonal matching pursuit (OMP) algorithm.

A new mixed method for solving linear models that may provide higher accuracy when OMP is inaccurate.

An automatic flow that may construct a quadratic model when a linear model is insufficient.

A new method that may assign the variance of cross terms in a quadratic model to its two related variables.

Each of these points is now described in detail. Each technique may stand alone, or may be combined into the comprehensive methodology.

As described previously, the simplest approach to the problem is to solve a linear model, e.g.:

$$y = \alpha_0 + \alpha_1 x_1 + \alpha_2 x_2 + \ldots + \alpha_N x_N + \epsilon$$

The linear model contains N+1 basis functions $\{1, x_1, \ldots, x_n\}$ and thus needs at least N+1 samples to be uniquely determined by least squares. Therefore, if the number of samples M is greater than N, the least squares approach may be taken to solve the linear model. Otherwise, orthogonal matching pursuit (OMP) may be applied. As previously noted, it has been proven that for Gaussian random samples, the number of samples for OMP to accurately reconstruct a model is $O(S \cdot \log N)$, where S denotes the number of non-zero variables.

Estimating OMP Accuracy

In one embodiment, estimating the accuracy of the OMP algorithm being applied in an underdetermined modeling scenario may be the first part of an improved methodology for selectively applying different modeling approaches of increasing computational expense as needed. Thus, if $M \geq d \cdot S \cdot \log N$, OMP may be deemed sufficiently accurate. S may be obtained as part of the OMP result and may vary somewhat depending on the details of OMP implementation, and d may be a fixed empirically determined constant obtained from experiments.

However, while OMP may be able to obtain a deterministic solution to an underdetermined linear system, its accuracy may degrade rapidly as M falls below the minimum sample requirement described. On the other hand, despite the disadvantages of the "first" metric previously described, the accuracy of its ranking of basis functions degrades smoothly and does not suffer from the rapid accuracy decline seen with decreasing samples in OMP. The positive features of the different approaches may be beneficially combined.

Mixed Method for Solving Linear Models

A new mixed method for resolving the accuracy shortcomings of OMP may thus be briefly described as follows:

1. Rank the basis functions based on the "first" metric
2. While not enough variance is explained:
{
   3. Select one additional basis function based on the rank
   4. Solve least squares with all selected basis functions
}

An internal threshold may be tuned by a user to determine how much explained variance is "enough", as with OMP. The new mixed method may look similar to OMP, but the new basis function selection in part 3 is based instead on the "first" metric. That is, the additional basis function is selected based on rank, while in contrast OMP selects the additional basis function based on the actual data. The new mixed method may thus avoid the rapid accuracy decline of OMP while retaining other benefits of OMP and the "ordered" metric of the prior application.

An example describing the benefits of selective use of the new mixed method for better solving underdetermined linear models is now provided. A series connection of 6500 resistors is constructed and simulated. The first ten of the resistors (R0 through R9) are described by a high variance model, while the remaining 6490 resistors (R10 through R6499) are described by a low variance model. The first ten resistors are thus more likely to be the relatively influential or important devices contributing to overall circuit performance (e.g., total series resistance) variation.

Figure 5A:
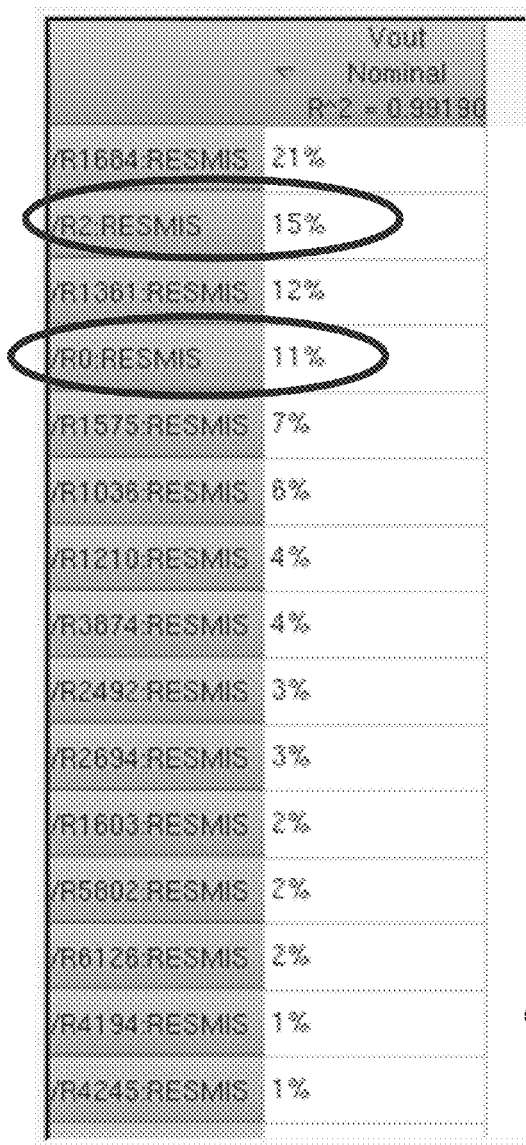
FIGS. 5A-5B are diagrams of circuit variation due to detected important devices, according to an embodiment.
Figure 5B:
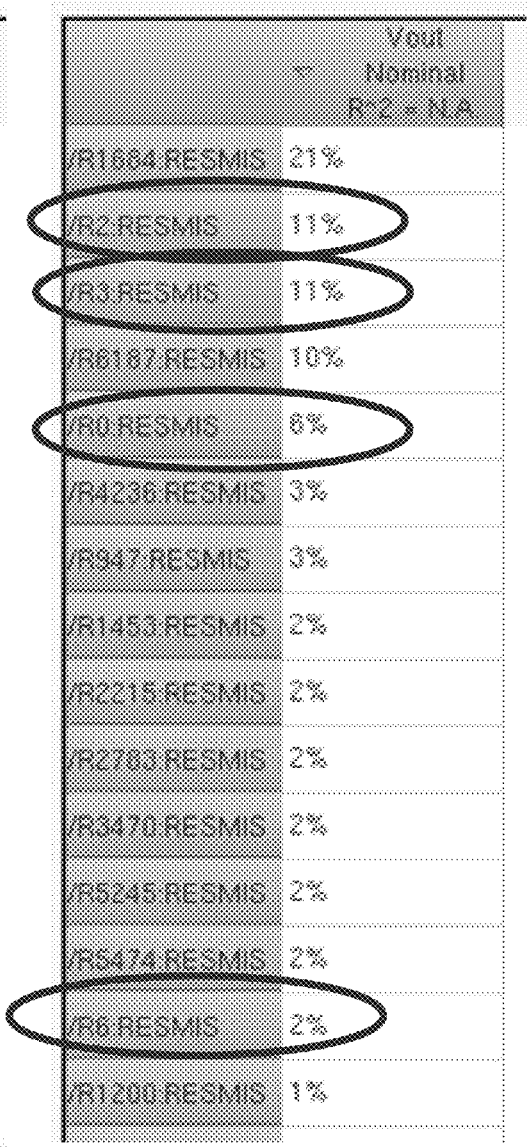

A portion of the netlist governing the device model variations, as used in one exemplary commercially available simulator, for this linear circuit is shown here:
statistics {
mismatch {
   vary RESMIS dist=unif std=1
   }
}
subckt myres100 (p1 p2)
r1 p1 p2 resistor r=RESMIS*100
ends myres100
subckt myres (p1 p2)
r1 p1 p2 resistor r=RESMIS*1
ends myres The exemplary circuit may be successfully modeled with OMP with roughly 200 simulations. However, if only 80 simulations are performed, the new mixed method results in better accuracy compared to OMP. As shown in FIG. 5A, the OMP process captures only two of the important devices in 80 simulations. A process using the "first" metric (not shown) generates a similar order as the new mixed method, but all $R^2$ percentage values are zero. The embodiment described above may first detect the inaccuracy of the OMP scheme (and may selectively warn the user of it), and then may responsively apply the new mixed method, which captures four of the important devices as shown in FIG. 5B.

Enhancing Accuracy Beyond Linear Models

In the example above, when M≤N, the passing of the OMP accuracy test indicates that a linear model is sufficient, while the failing of the OMP accuracy test may trigger an attempt to find a better linear model using the new mixed method. That attempt may or may not succeed. When M>N, there are enough samples to fit a good linear model, but that also does not necessarily guarantee the linear model approach has succeeded.

In some instances, it is possible that the performance of a circuit has a nonlinear relationship with process variables. Thus, a low model $R^2$ value may indicate the linear model, however chosen, is simply not capable of addressing the underlying problem. A description is now provided of an embodiment for automatically adding necessary quadratic terms, to improve model accuracy. This embodiment may serve as the third part in the comprehensive methodology described above, or may be used on its own.

A full quadratic model involves approximately $N^2/2$ basis functions. If N is large, which may not be unusual, the computation cost for solving a huge system may be prohibitive. In such cases, the quadratic model is too expensive to use all the time. It has been proposed to therefore solve the linear model, then include quadratic and cross terms only from important linear terms. The following reference discusses this concept further, and is hereby incorporated by reference in its entirety: W. Zhang, T. Chen, M. Ting, and X. Li, "Toward efficient large-scale performance modeling of integrated circuits via multi-mode/multi-corner sparse regression," Design Automation Conference, pp. 897-902, 2010.

Figure 6:
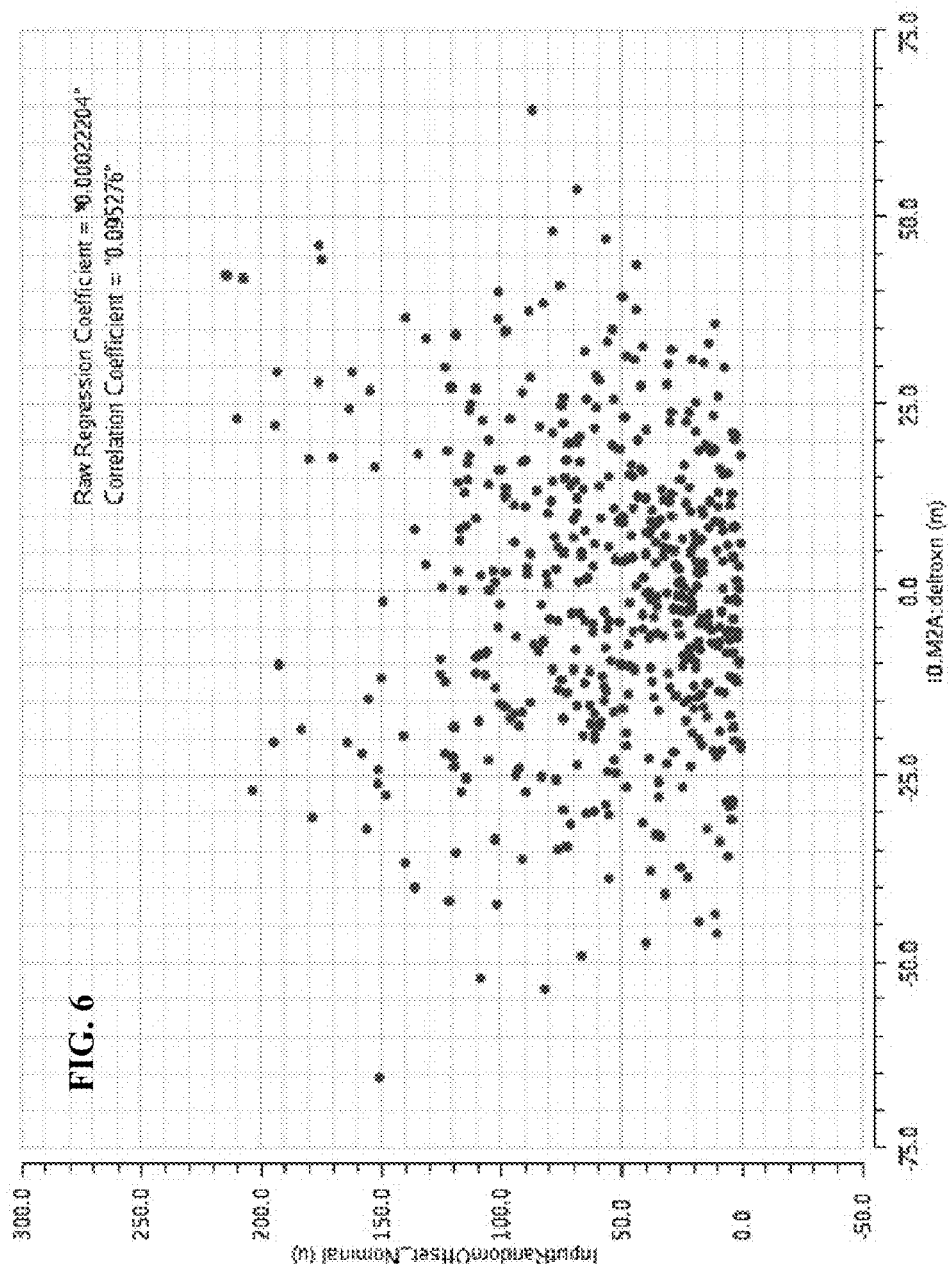
FIG. 6 is a scatter plot of random offset versus a mismatch variable, according to an embodiment.

However, there may be circuits with performance that have strong quadratic effects but negligible linear effects, for which such a heuristic fails. FIG. 6 depicts a typical V-shaped variation observed from such circuits. FIG. 6 is a scatter plot of random offset versus a mismatch variable, and shows a strong quadratic pattern. This effect cannot be resolved with the modeling flows currently in the literature.

A heuristic that can select the most important variables for a linear and quadratic model without excessive computational expense is therefore needed. Such a heuristic may be applied on its own, or as part of the comprehensive progressive methodology described above. Computational complexity is observed to result mainly from the cross terms, so in one embodiment the heuristic of solving the linear model, then including quadratic and cross terms only from important linear terms described above may be replaced by performing OMP on both linear and quadratic terms to select the most important variables. The full linear and quadratic model may then be fitted using OMP, with the selected cross terms.

In one embodiment, OMP may be used to solve the following model:

$$y = a_0 + a_1 x_1 + a_2 x_2 + \ldots + a_N x_N + b_1 \frac{x_1^2 - 1}{\sqrt{2}} + \ldots + b_N \frac{x_N^2 - 1}{\sqrt{2}} + \varepsilon$$

The quadratic basis function is selected as $$\frac{x_i^2 - 1}{\sqrt{2}}$$

because when $x_i$ is normalized to N(0, 1), if variables are independent then $$\left\{ 1, x_i, \frac{x_i^2 - 1}{\sqrt{2}} \right\}$$

for i=1, 2, ..., N forms part of the Hermite polynomials. The Hermite polynomials are a set of orthogonal polynomials for independent N(0, 1) random variables, and satisfy:

$$E(\Psi_i(x) \cdot \Psi_j(x)) = \begin{cases} 1 & i = j \\ 0 & i \neq j \end{cases}$$

The Hermite polynomials below order 3 are:

$$\{1, x_i, (x_i^2 - 1)/\sqrt{2}, x_i x_j\}$$
$$i = 1, 2, \ldots, N;$$
$$j = 1, 2, \ldots N; i \neq j$$

Using orthogonal polynomials may reduce correlation between columns of the linear system, and may improve OMP accuracy. The following reference discusses this concept further, and is hereby incorporated by reference in its entirety: J. Tropp and S. Wright, "Computational methods for sparse solution of linear inverse problems," Proceedings of the IEEE, vol. 98, no. 6, pp. 948-958, 2010.

In one embodiment, after applying OMP on the linear and quadratic terms, the terms may be sorted by the variance explained. The set of important variables V may be selected based on two criteria:

1. The number of selected variables cannot exceed a threshold determined by computational capability.
2. If OMP stops before meeting the first criterion, select variables based on non-zero terms in OMP.

Finally, OMP may be performed to solve the following model:

$$y = a_0 + \sum_{i=1}^{N} a_i x_i + \sum_{i=1}^{N} b_i \frac{x_i^2 - 1}{\sqrt{2}} + \sum_{i,j \in V, i \neq j} c_i x_i x_j + \varepsilon$$

where the cross terms are Hermite polynomials based on V. This embodiment may be of particular utility in library characterization tasks, where prohibitively high computational costs are a frequent problem.

Assigning Cross Term Variance

After solving the model above, a variance may be assigned to each basis function. The variance may then be assigned to variables to provide useful design insight. The variances of the linear and quadratic terms are related to one variable. However, it is non-trivial to assign the variance of the cross terms. Intuitively, if one variable has explained more variance of a cross term than the other variable has, it would be desirable to also assign more variance of the cross term to that one variable. An embodiment based on this intuition has been developed from two previous concepts used for related problems.

First, the following reference discusses the concept of an extended sensitivity metric, and is hereby incorporated by reference in its entirety: J. Liu and P. Gustafson, "On Average Predictive Comparisons and Interactions," International Statistical Review, vol. 76, no. 3, pp. 419-432, December 2008. An extended sensitivity metric for variables in a nonlinear model may be defined as:

$$\delta_i = E\left(\frac{\partial f(x)}{\partial x_i}\right)$$

where E denotes an expectation value, and $$f(x) = \sum_{i=1}^{P} a_i f_i(x)$$

For a linear model, $$f(x) = a_0 + \sum_{i=1}^{N} a_i x_i$$

and $$\frac{\partial f(x)}{\partial x_i} = a_i$$

so that it is equivalent to a linear regression coefficient.

Second, one of the methods to assign relative importance to basis functions is the beta-square method, as described in the previously cited Groemping reference and summarized below. If all basis functions are normalized, for the model $$y = \sum_{i=1}^{P} a_i f_i(x) + \varepsilon$$

the relative importance of basis function i is defined as the squared value of normalized linear regression coefficient:

$$\Delta_i = a_i^2$$

Combining these concepts and adapting them to the current problem, in a nonlinear model the importance of a variable may now be defined as:

$$\Delta_i = E\left(\left(\frac{\partial f(x)}{\partial x_i}\right)^2\right)$$

This is equivalent to the beta-square method when the model is linear. For a full quadratic model $$f(x) = a_0 + \sum_{i=1}^{N} a_i x_i + \sum_{i=1}^{N} b_i \frac{x_i^2 - 1}{\sqrt{2}} + \sum_{i \neq j} c_i x_i x_j$$

$$\Delta_i = E\left(\left(\frac{\partial f(x)}{\partial x_i}\right)^2\right) = E\left(\left(a_i + \sqrt{2}\, b_i x_i + \sum_{i \neq j} c_{ij} x_j\right)^2\right) = a_i^2 + 2b_i^2 + \sum_{i \neq j} c_{ij}^2$$

Therefore, in one embodiment the $R^2$ of cross terms is split by:

$$R^2(x_i x_j)_i = \frac{\Delta_i}{\Delta_i + \Delta_j} R^2(x_i x_j),\ R^2(x_i x_j)_j = \frac{\Delta_j}{\Delta_i + \Delta_j} R^2(x_i x_j)$$

where $$\Delta_i = a_i^2 + 2b_i^2 + \sum_{i \neq j} c_{ij}^2$$

and $$\Delta_j = a_j^2 + 2b_j^2 + \sum_{k \neq j} c_{kj}^2$$

define the relative influence of each variable.

Intuitively, if the two variables have similar impact, or the cross term $x_i x_j$ itself carries a strong weight, this approach will tend to evenly split the variance. However, if one variable has significantly stronger impact, more variance may be assigned to it.

Figure 7:
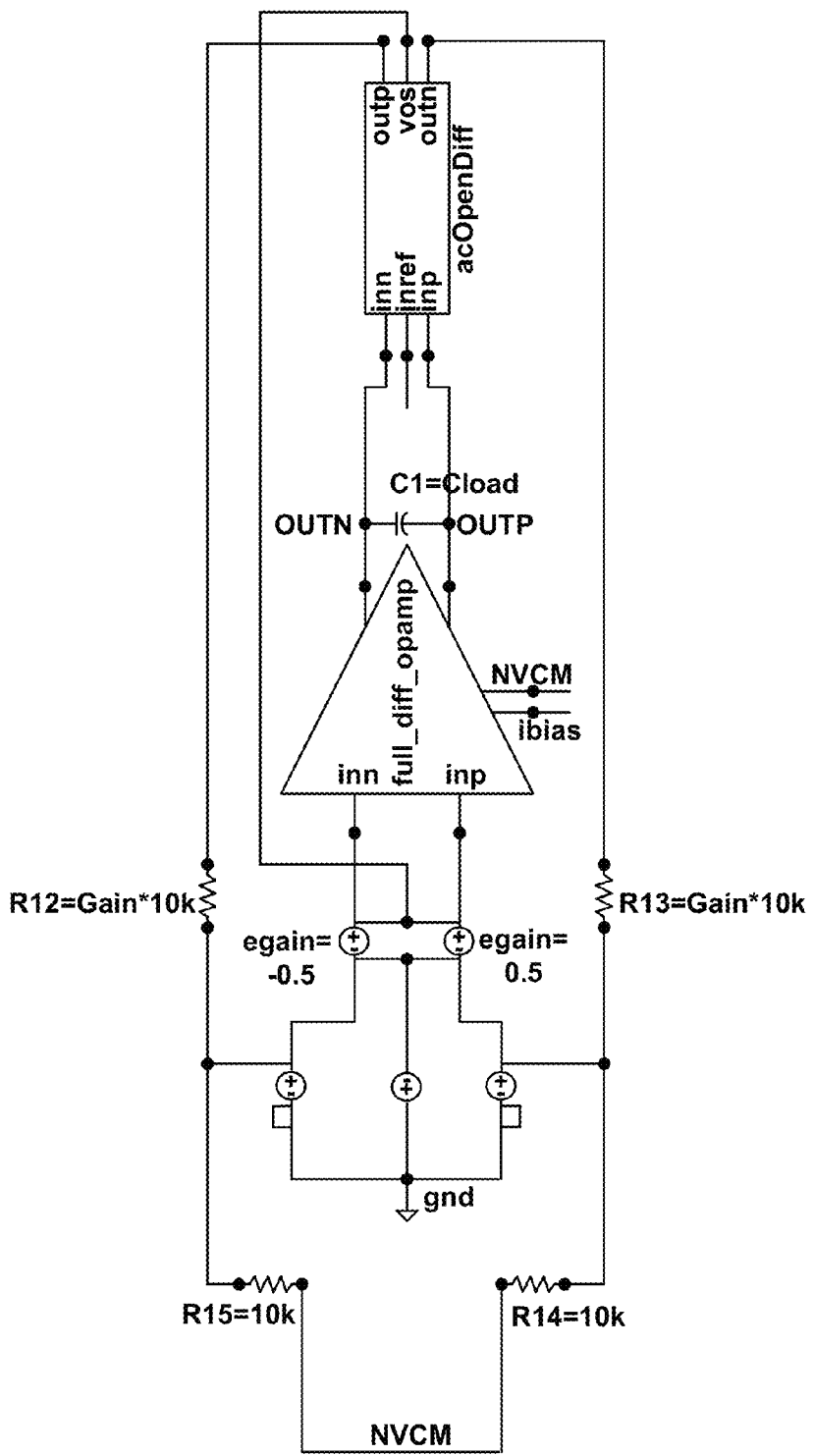
FIG. 7 is an operational amplifier circuit with nonlinear variance in input offset voltage due to mismatch variation, according to an embodiment.
Figure 8A:
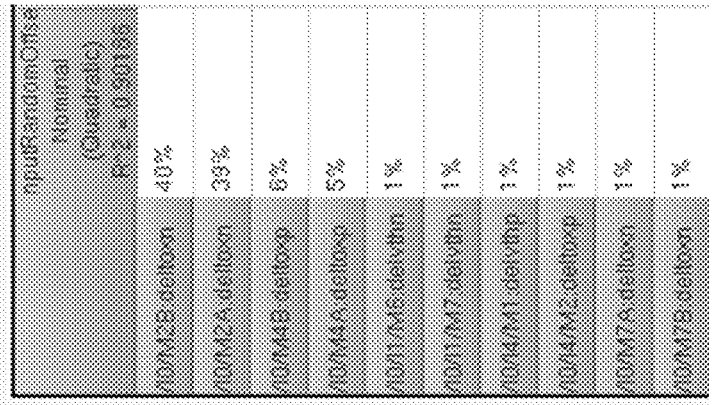
FIGS. 8A-8C are diagrams of circuit variation according to a different models, according to an embodiment.
Figure 8B:
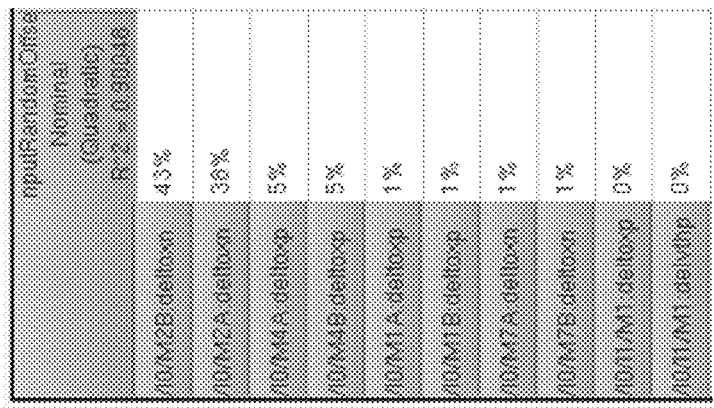
Figure 8C:
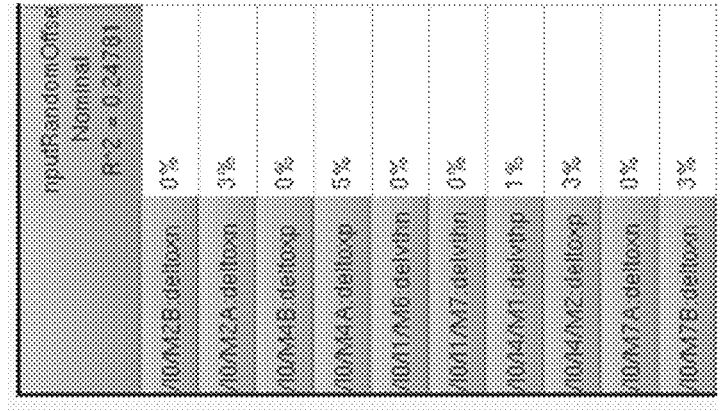

An example describing the benefits of the new method for assigning cross term variance is now provided. In the operational amplifier circuit of FIG. 7, 138 random variables are included. The random offset in this case is defined as the absolute value of the input offset voltage, i.e., abs(V(inn)—V(inp)). Three different modeling methods are compared:

1. Applying OMP on a linear model with 500 Monte Carlo samples
2. Applying OMP on a full quadratic model with 2000 Monte Carlo samples (treated as the golden standard result)
3. Applying the new variance assignment method with 500 Monte Carlo samples As shown in FIG. 8A, the circuit performance variance cannot be properly explained by a linear model, as shown by an $R^2$ value of only 0.24781. The golden standard result of FIG. 8B required four minutes of processing time, while the new variance assignment method for FIG. 8C required only ten seconds of processing time to produce comparable results and similar $R^2$ values of over 0.9.

Figure 9:
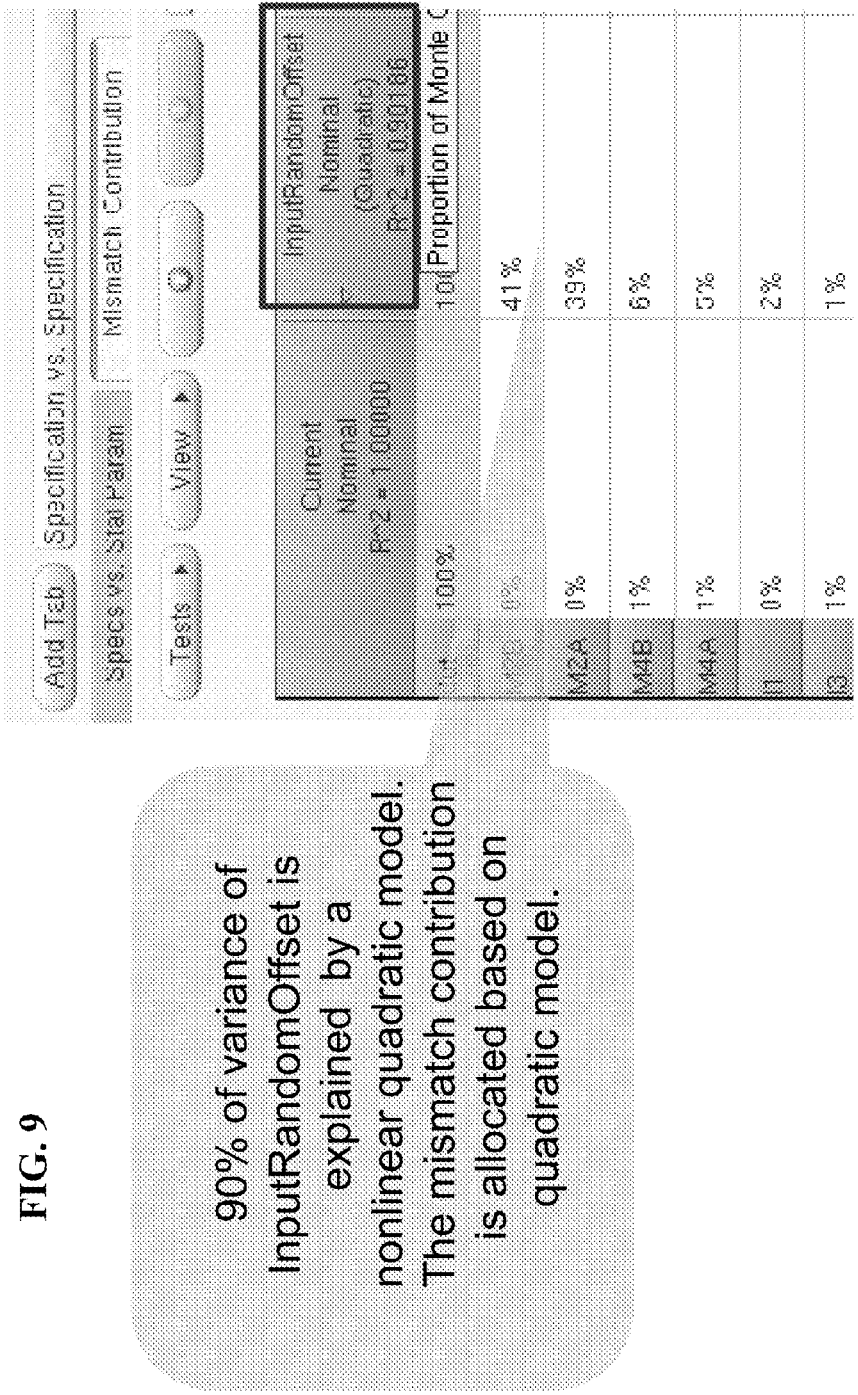
FIG. 9 is a diagram of circuit variation according to a quadratic model with mismatch contribution allocated according to an embodiment.

As shown in FIG. 9, ninety percent of the variance of the random offset InputRandomOffset is explained by the quadratic model. The mismatch contributions are allocated based on the quadratic model, as described above.

Figure 10:
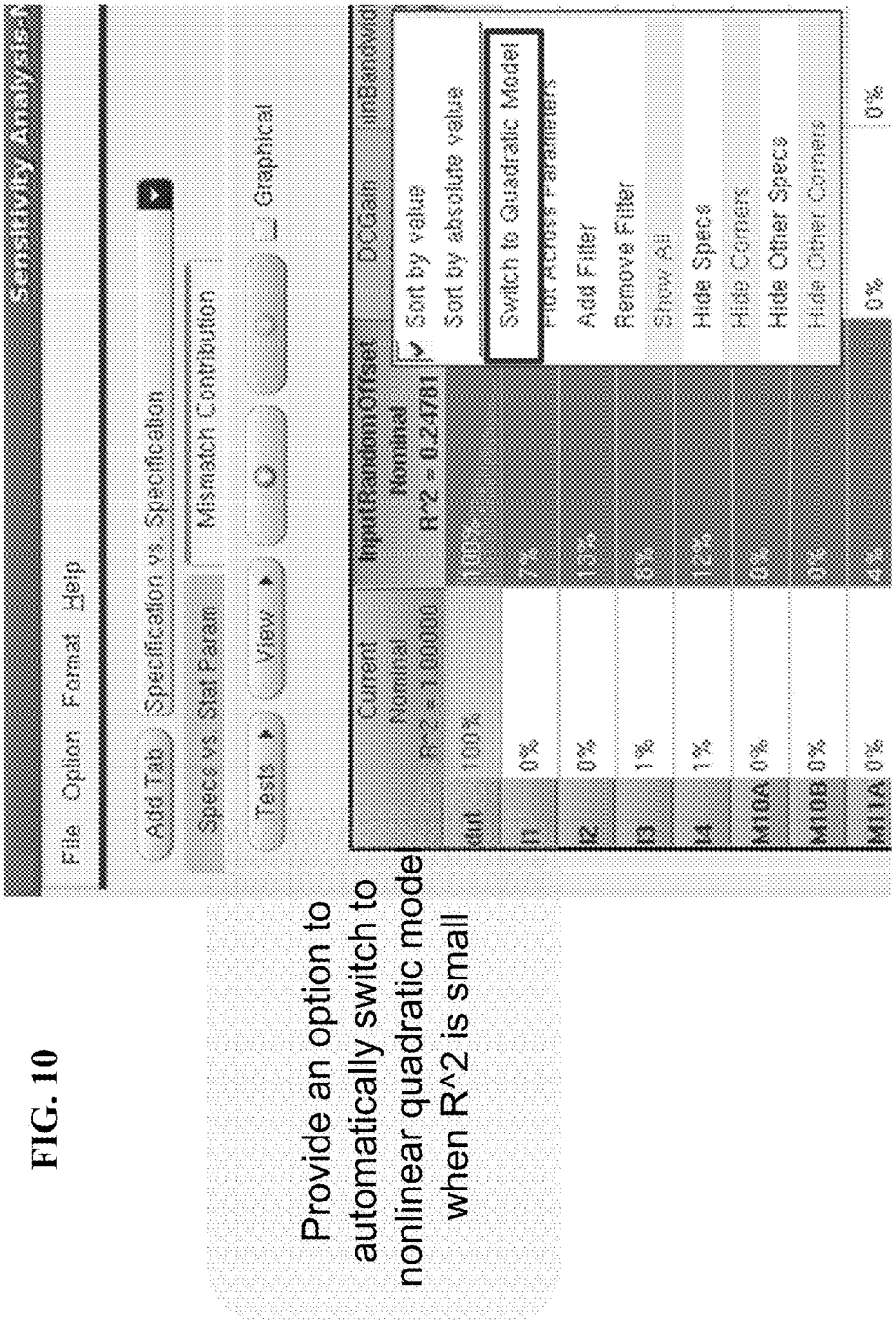
FIG. 10 is a graphical user interface providing an option to automatically switch to a quadratic model when needed, according to an embodiment.

Referring now to FIG. 10, in one embodiment a graphical user interface may provide a displayed option to automatically switch to a quadratic model when $R^2$ is small.

Figure 11:
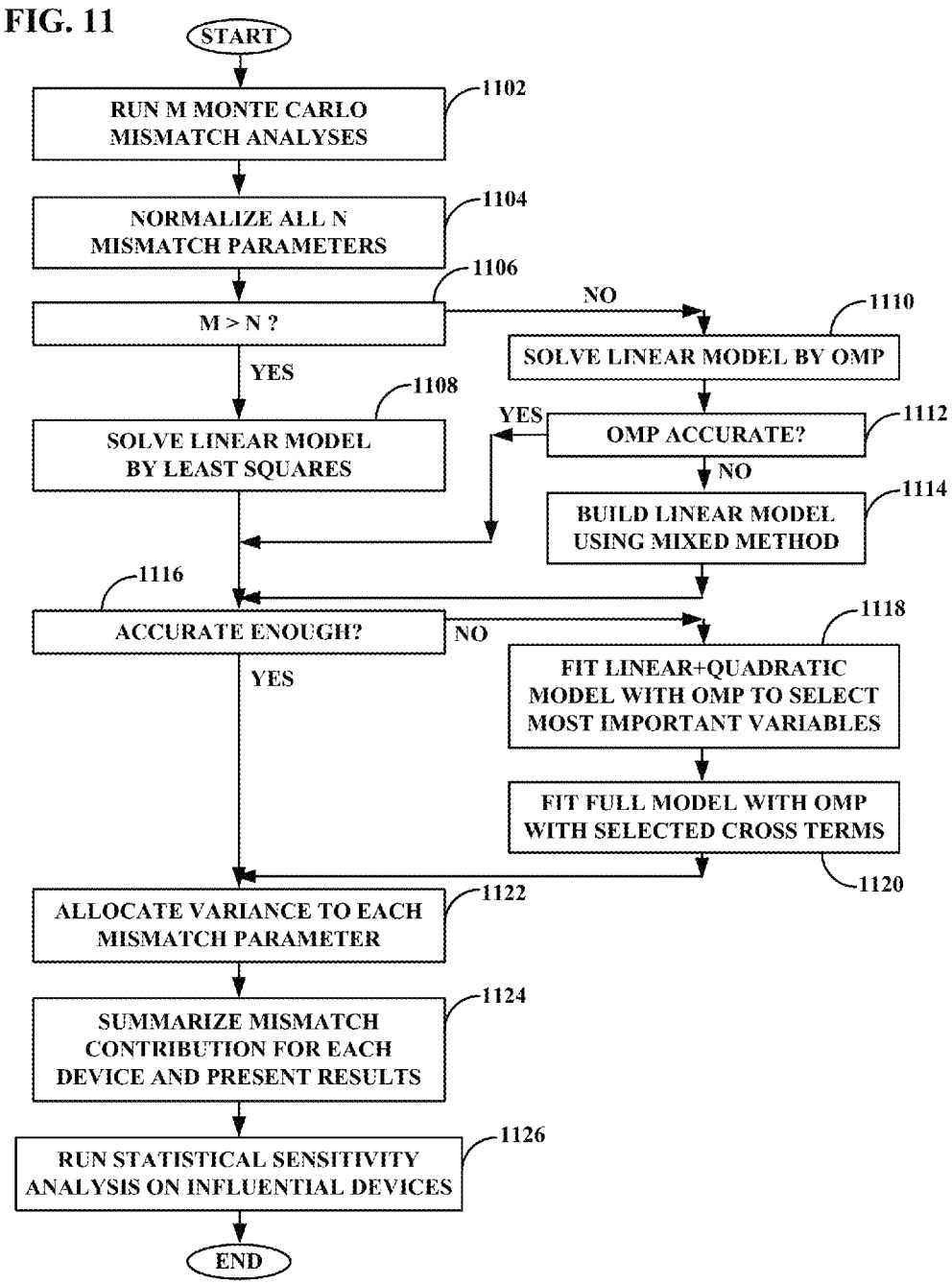
FIG. 11 is a flowchart of a mismatch contribution analysis method, according to an embodiment.

FIG. 11 is a flowchart of the comprehensive modeling methodology described above. An objective of this methodology may be to selectively combine separate modeling operations, adding computational complexity as needed, to reach the goal of determining device mismatch contributions to circuit variation in a measurably successful manner given a limited number of samples. At 1102, one or more simulators may run M Monte Carlo mismatch analyses to acquire data on circuit performance and its variation. At 1104, the method may normalize all N of the individual mismatch parameters. At 1106, the method may determine whether there is enough data available to directly solve for all coefficients in the multivariate linear regression model, i.e. whether M exceeds N. If so, the method may proceed to 1108 to perform the multivariate linear regression evaluation, but if not, the method may proceed to 1110, to solve the linear model by finding an optimized approximate solution via OMP.

At 1112, the method may determine whether an optimized approximate solution found via OMP is sufficiently accurate by determining if M≥d·S·log N. If so, the solution found in 1112 may be used, and execution moves to 1116. If not, the method may proceed to 1114 where a new linear model may be built and solved using the new mixed method described above, and execution then moves to 1116.

At 1116, the linear model, whether obtained through the 1108 least squares route or the 1110 OMP route or the 1114 mixed method route, may be checked for accuracy. In one embodiment, a comparison of the $R^2$ value of the linear model may be made against a predetermined or user-tunable threshold value to determine if accuracy is sufficient. If so, the method may proceed to 1122. If not, the method may instead proceed to 1118, where a nonlinear model may be engaged, for example comprising a linear plus quadratic model. The model of 1118 may be built using OMP on both linear and quadratic terms, to select the most important variables. In one embodiment, the most important variables are selected according to a maximum computational capability and according to non-zero terms in OMP. The model may employ orthogonal polynomials such as the Hermite polynomials for its quadratic basis functions. At 1120, the method may proceed to fit a full linear and quadratic model using OMP, with the selected cross terms.

At 1122, the method may allocate variance to each mismatch parameter. In one embodiment, the variance of cross terms may be assigned according to the relative importance of a given variable in the cross term by considering that variable's own impact and the impact of the cross term. At 1124, the method may summarize the mismatch contribution for each device and present its results. At 1126, the method may run statistical sensitivity analyses on the more influential devices.

Figure 12:
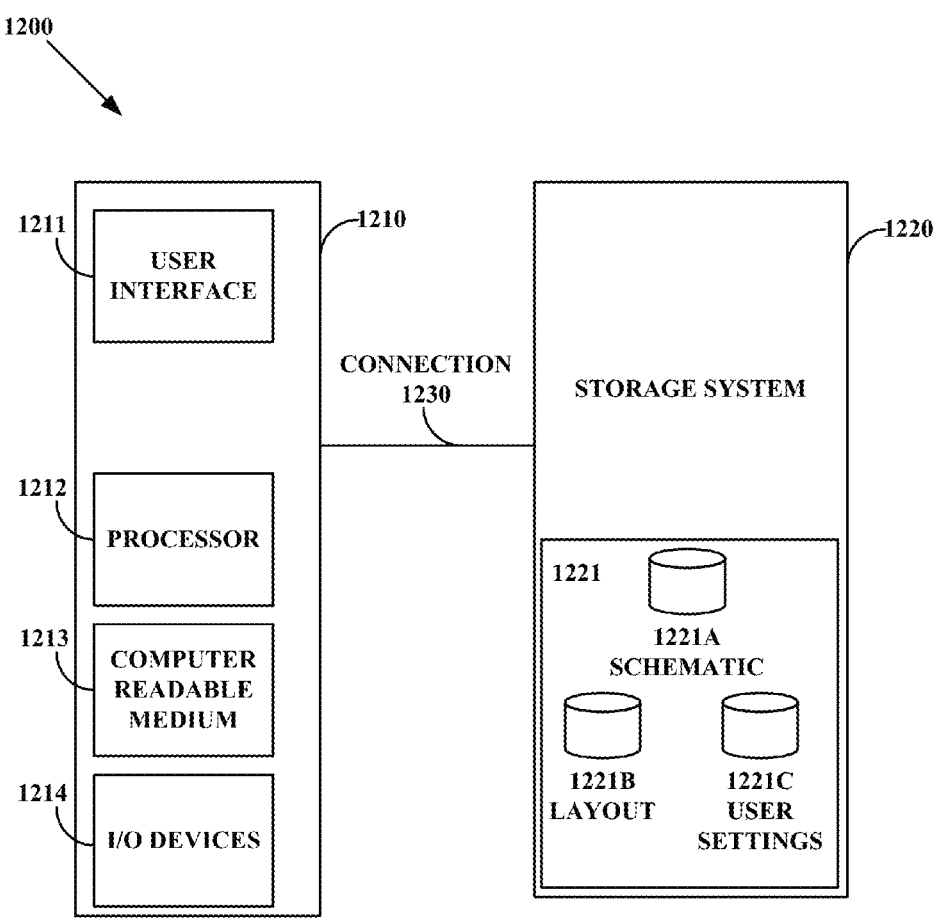
FIG. 12 is a block diagram of an analog fault simulation system, according to an embodiment.

Referring now to FIG. 12, a block diagram of an exemplary mismatch variation simulation system 1200 is shown according to an embodiment. This system may provide simulator functionality for any of the methods described above. A user may access the mismatch variation sensitivity analysis system 1200 through a standalone client system, client-server environment, or a network environment. System 1200 may comprise one or more clients or servers 1210, one or more storage systems 1220, and a connection or connections 1230 between and among these elements.

Client 1210 may execute instructions stored on a computer readable medium that provides a user interface 1211 that may allow a user to access storage system 1220. The instructions may be part of a software program or executable file that may operate electronic design automation (EDA) software. Client 1210 may be any computing system, such as a personal computer, workstation, or other device employing a processor which is able to execute programming instructions. User interface 1211 may be a GUI run in a user-controlled application window on a display. A user may interact with user interface 1211 through one or more input/output (I/O) devices 1214 such as a keyboard, a mouse, or a touch screen.

Storage system 1220 may take any number of forms, including but not limited to a server with one or more storage devices attached to it, a storage area network, or one or a plurality of non-transitory computer readable media. Databases 1221 may be stored in storage system 1220 such that they may be persistent, retrieved, or edited by the user. Databases 1221 may include a schematic database 1221A, a layout database 1221B, and a user input database 1221C. These databases may be kept as separate files or systems, or may be merged together in any appropriate combination.

Only one client 1210 is shown connected to storage system 1220 through connection 1230, which may be a simple direct wired or wireless connection, a system bus, a network connection, or the like, to provide client 1210 with access to storage system 1220. In another aspect, connection 1230 may enable multiple clients 1210 to connect to storage system 1220. The connection may be part of a local area network, a wide area network, or another type of network, again providing one or more clients with access to storage system 1220. Depending on system administrator settings, client 1210's access to system storage 1220 or to other clients may be limited.

Figure 13:
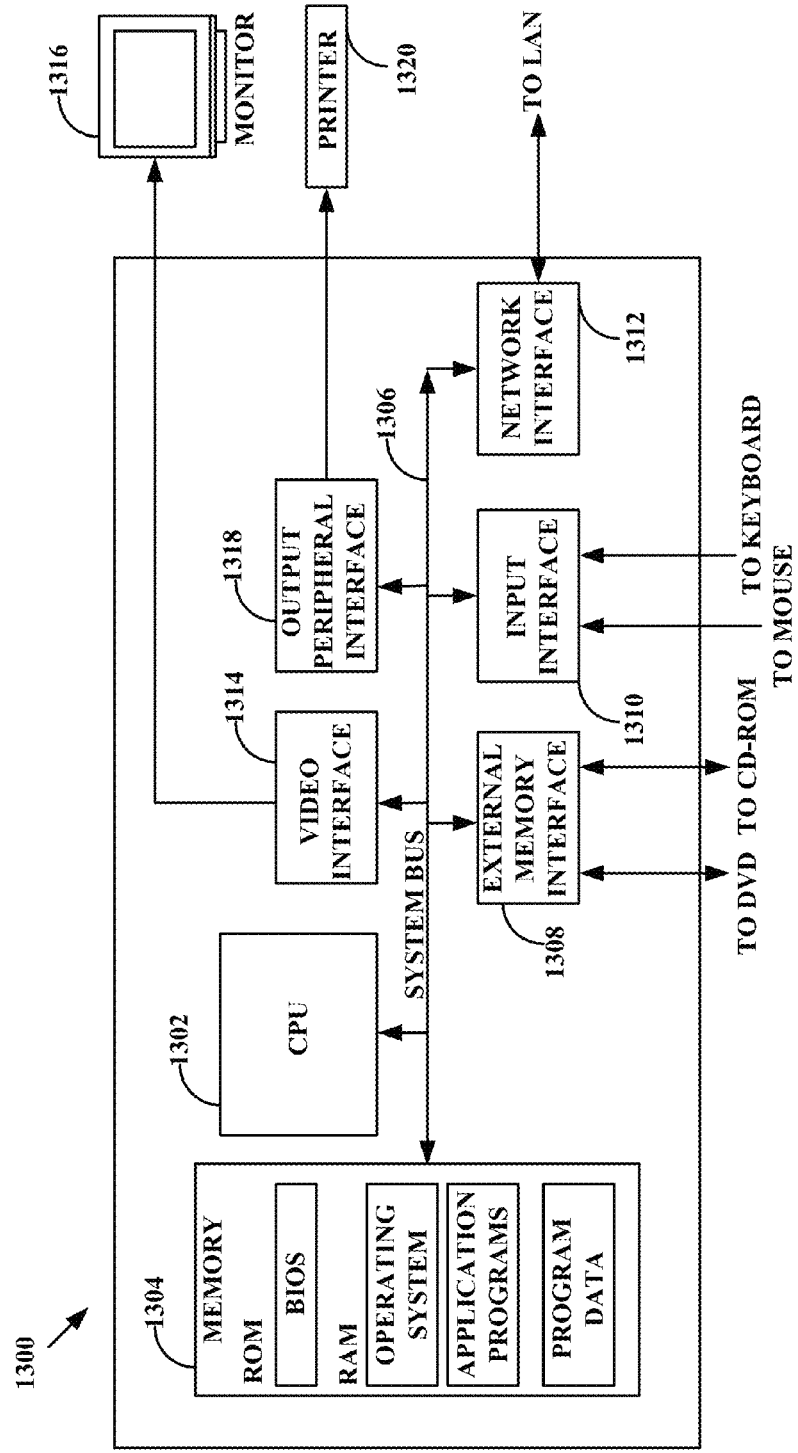
FIG. 13 is a diagram of a computer system, according to an embodiment.

FIG. 13 depicts a computer system comprising the structure for implementation of the embodiments described above. Computer system 1300 comprises a central processing unit (CPU) 1302 that processes data stored in memory 1304 exchanged via system bus 1306. Memory 1304 typically includes read-only memory, such as a built-in operating system, and random-access memory, which may include an operating system, application programs, and program data. Computer system 1300 also comprises an external memory interface 1308 to exchange data with a DVD or CD-ROM for example. Further, input interface 1310 may serve to receive input from user input devices including but not limited to a keyboard and a mouse. Network interface 1312 may allow external data exchange with a local area network (LAN) or other network, including the internet. Computer system 1300 also typically comprises a video interface 1314 for displaying information to a user via a monitor 1316. An output peripheral interface 1318 may output computational results and other information to output devices including but not limited to a printer 1320.

Computer system 1300 may comprise for example a personal computer or an engineering workstation, each of which is widely known in the art and is commonly used for integrated circuit design tasks, along with software products commercially available for performing computer-aided integrated circuit design tasks including mismatch variation simulation. The computer system of FIG. 13 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention will be apparent to ordinarily skilled artisans. The invention is limited only by the scope of the appended claims.

What is claimed is:

1. A computer-implemented method for analyzing circuit performance variations, comprising:
   using a computer, allocating circuit performance variation by weighting individual variation parameters in a model selected via a selection process that progressively increases model computational complexity until the model is measurably successful;
   summarizing device performance variations by summing all weighted individual variation parameter values corresponding to the devices in a circuit design;
   ranking the device performance variations; and
   identifying and outputting at least one influential device according to device performance variation rank order,
   wherein the selection process comprises:
      if a number of data samples exceeds a number of mismatch parameters, then selecting and solving a first linear model by least squares, else selecting and solving a second linear model by an orthogonal matching pursuit (OMP) algorithm and determining if the second linear model solution accuracy is sufficient; and
      if the accuracy of the second linear model solution is insufficient, selecting and solving a third linear model via a mixed method.

2. The method of claim 1 wherein the determining if the second linear model solution accuracy is sufficient comprises:
   comparing M to $d \cdot S \cdot \log(N)$, where M is the number of data samples, N is the number of mismatch parameters, S is a number of non-zero variables determined by the OMP algorithm, and d is an empirically determined constant; and
   if M is not less than $d \cdot S \cdot \log(N)$ then determining that the solution accuracy is sufficient.

3. The method of claim 1 wherein the mixed method comprises:
   ranking basis functions according to a metric that determines an amount of variance explained by only a first regressor when all other individual contributions are ignored; and
   while less than a predetermined sufficiency of variance is explained by the basis functions:
      selecting one additional basis function based on the ranking; and
      solving the third linear model using least squares regression with all selected basis functions.

4. The method of claim 1 wherein the selection process further comprises:
   if the accuracy of the selected linear model solution is insufficient, then fitting a quadratic model not including cross terms using the OMP algorithm in a first pass to select a number of influential variables, and fitting the quadratic model including cross terms for the influential variables using the OMP algorithm in a second pass.

5. The method of claim 4 further comprising selecting the influential variables according to a first criterion and a second criterion,
wherein the first criterion comprises limiting the number of the selected influential variables to a threshold value determined by computational capability, and
wherein the second criterion comprises, if the first OMP pass stops before meeting the first criterion, selecting the influential variables according to sorted non-zero terms found during the first OMP pass.

6. The method of claim 4 wherein basis functions of the quadratic model comprise Hermite polynomials.

7. The method of claim 4 further comprising assigning cross term variance in the quadratic model, comprising:
for model variables i and j:
assigning a relative importance to i comprising $$\Delta_i = a_i^2 + 2b_i^2 + \sum_{i \neq j} c_{ij}^2;$$

and
assigning a relative importance to j comprising $$\Delta_j = a_j^2 + 2b_j^2 + \sum_{k \neq j} c_{kj}^2.$$

8. The method of claim 1 further comprising performing a statistical sensitivity analysis on selected influential devices.

9. The method of claim 1 further comprising increasing at least one of circuit performance, circuit yield, and circuit design robustness.

10. A non-transitory computer readable medium storing instructions that, when executed by a processor, perform a method for allocating circuit variance into device mismatch parameters, the method comprising:
allocating circuit performance variation by weighting individual variation parameters in a model selected via a selection process that progressively increases model computational complexity until the model is measurably successful;
summarizing device performance variations by summing all weighted individual variation parameter values corresponding to the devices in a circuit design;
ranking the device performance variations; and
identifying and outputting at least one influential device according to device performance variation rank order,
wherein the selection process comprises:
if a number of data samples exceeds a number of mismatch parameters, then selecting and solving a first linear model by least squares, else selecting and solving a second linear model by an orthogonal matching pursuit (OMP) algorithm and determining if the second linear model solution accuracy is sufficient; and
if the accuracy of the second linear model solution is insufficient, selecting and solving a third linear model via a mixed method.

11. The medium of claim 10 wherein the selection process further comprises:
if the accuracy of the selected linear model solution is insufficient, then fitting a quadratic model not including cross terms using the OMP algorithm in a first pass to select a number of influential variables, and fitting the quadratic model including cross terms for the influential variables using the OMP algorithm in a second pass.

12. The medium of claim 10 wherein the method further comprises performing a statistical sensitivity analysis on selected influential devices.

13. The medium of claim 10 wherein the method further comprises increasing at least one of circuit performance, circuit yield, and circuit design robustness.

14. A system for allocating circuit variance into device mismatch parameters, the system comprising:
a non-transitory computer-readable medium to store a circuit design;
a processor executing instructions to:
allocate circuit performance variations by weighting individual variation parameters in a model selected via a selection process that progressively increases model computational complexity until the model is measurably successful;
summarize device performance variation by summing all weighted individual variation parameter values corresponding to the devices in a circuit design;
rank the device performance variations; and
identify and output at least one influential device according to device performance variation rank order,
wherein the selection process comprises:
if a number of data samples exceeds a number of mismatch parameters, then selecting and solving a first linear model by least squares, else selecting and solving a second linear model by an orthogonal matching pursuit (OMP) algorithm and determining if the second linear model solution accuracy is sufficient; and
if the accuracy of the second linear model solution is insufficient, selecting and solving a third linear model via a mixed method.

15. The system of claim 14 wherein the selection process further comprises:
if the accuracy of the selected linear model solution is insufficient, then fitting a quadratic model not including cross terms using the OMP algorithm in a first pass to select a number of influential variables, and fitting the quadratic model including cross terms for the influential variables using the OMP algorithm in a second pass.

16. The system of claim 14 wherein the processor further executes instructions to perform a statistical sensitivity analysis on selected influential devices.

17. The system of claim 14 wherein the processor further executes instructions to increase at least one of circuit performance, circuit yield, and circuit design robustness.

* * * * *